United States Patent [19]
Kimura et al.

[11] Patent Number: 5,830,566
[45] Date of Patent: Nov. 3, 1998

[54] FRICTION MATERIAL FOR DAMPERS AND PROCESS FOR PRODUCING THE SAME

[75] Inventors: Kohichi Kimura; Yoshihiko Goto; Nobuhiro Torii, all of Kanagawa; Hiroshi Katagiri; Hideyuki Miyazawa, both of Nagano; Yoshiyuki Motoyoshi, Kanagawa, all of Japan

[73] Assignees: Nichias Corporation, Tokyo; Nichias Ceratech Corporation, Kamiminochi-gun, both of Japan

[21] Appl. No.: 542,595

[22] Filed: Oct. 13, 1995

[30] Foreign Application Priority Data

Oct. 14, 1994 [JP] Japan .................................. 6-274335
Oct. 19, 1994 [JP] Japan .................................. 6-278565

[51] Int. Cl.$^6$ ........................................................ B32B 5/16
[52] U.S. Cl. ........................ 428/323; 428/357; 428/359; 428/361; 428/364; 428/397; 428/401; 428/402; 428/408; 264/430

[58] Field of Search ........................................ 428/323, 357, 428/359, 361, 364, 397, 401, 402, 408; 264/430

Primary Examiner—Richard Weisberger
Attorney, Agent, or Firm—Cushman Darby & Cushman IP Group Of Pillsbury Madison & Sutro, LLP

[57] ABSTRACT

A molded friction material for a damper is disclosed, which contains, as a part of a friction regulating material, porous fibrous particulates having an average particle size of 0.5 to 2 mm and a bulk density of 0.1 to 0.2 g/cm$^3$ and comprising finely divided ceramic fibers or porous fibrous particulates having an average particle size of 0.1 to 5 mm and a bulk density of 0.2 to 2.0 g/cm$^3$ and comprising finely divided ceramic fibers, a filler, and a binder. The friction material exhibits excellent performance basically required of a friction material, such as mechanical strength and damping characteristics, and hardly squeaks during damping.

7 Claims, 5 Drawing Sheets

FRICTION MATERIAL FOR DAMPERS AND PROCESS FOR PRODUCING THE SAME

FIELD OF THE INVENTION

This invention relates to a friction material used in a damper of various vehicles and industrial machines and a process for producing the same.

BACKGROUND OF THE INVENTION

Various friction materials have hitherto been proposed for use in dampers used in automobiles and other vehicles and industrial machines. Generally used friction materials are produced by hot-press molding a molding material comprising one or more than one fibrous materials selected from inorganic fibers, such as asbestos and ceramic fiber, heat-resistant organic fibers, and metal fibers as a base material, a friction regulating material and other additives, and a thermosetting synthetic resin binder, such as a phenolic resin.

In developing a friction material, not only a coefficient of friction which is a factor directly relating to damping capacity and its temperature dependence but other various characteristics, such as wear resistance, mechanical strength, attack on a metallic material, and squeaks on damping, should be considered. These characteristics are controlled by properly combining the above-mentioned molding materials.

It is known that squeaks on damping can be prevented by introducing fine pores into a friction material. Effective means proposed therefor include reduction of the amount of a binder, use of long fibers as the fibrous base material, incorporation of a porous material, such as vermiculite, into a molding material, and reduction of the filling rate of a molding material.

However, these conventional methods for preventing squeaks involve significant reduction in strength and wear resistance of the friction material. Further, since porous materials like vermiculite have low heat resistance, incorporation of such materials incurs deterioration of high-temperature characteristics, particularly wear resistance, of the friction material.

SUMMARY OF THE INVENTION

An object of the present invention is to provide an improved friction material which exhibits excellent performance basically required of a friction material, such as mechanical strength and damping characteristics, and hardly squeaks during damping.

Another object of the present invention is to provide a process for producing the improved friction material.

The first embodiment of the present invention provides a molded friction material for a damper comprising a fibrous base material, a friction regulating material, and a thermosetting synthetic resin binder, wherein particulate ceramic fiber agglomerates, which are composed of finely divided ceramic fibers having a fiber length of 5 to 700 $\mu$m and an average fiber length of 50 to 150 $\mu$m and have an average particle size of 0.5 to 2 mm and a bulk density of 0.1 to 0.2 g/cm$^3$, are dispersed in the friction material as a part of the friction regulating material while retaining their porosity.

The friction material of the first embodiment is produced by a process comprising hot-press molding a molding material containing, as a part of a friction regulating material, particulate ceramic fiber agglomerates having an average particle size of 0.5 to 2 mm, a bulk density of 0.1 to 0.2 g/cm$^3$ and a degree of tightness of not less than 40% and composed of finely divided ceramic fibers having a fiber length of 5 to 700 $\mu$m and an average fiber length of 50 to 150 $\mu$m.

The second embodiment of the present invention provides a molded friction material for a damper comprising a fibrous base material, a friction regulating material, and a thermosetting synthetic resin binder, in which molded porous particulates, which are composed of finely divided ceramic fibers having a fiber length of 5 to 700 $\mu$m and an average fiber length of 50 to 150 $\mu$m, a filler and a binder and have an average particle size of 0.1 to 5 mm and a bulk density of 0.2 to 2.0 g/cm$^3$, are dispersed in the friction material while retaining their porosity.

The friction material of the second embodiment is produced by a process comprising hot-press molding a molding material containing, as a part of a friction regulating material, molded porous particulates having an average particle size of 0.1 to 5 mm and a bulk density of 0.2 to 2.0 g/cm$^3$ and composed of finely divided ceramic fibers having a fiber length of 5 to 700 $\mu$m and an average fiber length of 50 to 150 $\mu$m, a filler and a binder.

According to the present invention, every particulate ceramic fiber agglomerate or every molded porous particulate (hereinafter inclusively referred to as a fibrous particulate(s)) which is dispersed in the friction material while retaining its porosity provides a dense cluster of fine pores localized within a diameter of 0.5 to 2 mm or 0.1 to 5 mm. A number of the clusters of fine pores distributed through the friction material prevent squeaks of the friction material. Because the clusters of fine pores are supported by fine ceramic fibers, they have no adverse influences on the strength and damping characteristics of the friction material.

DETAILED DESCRIPTION OF THE INVENTION

Figure 1:
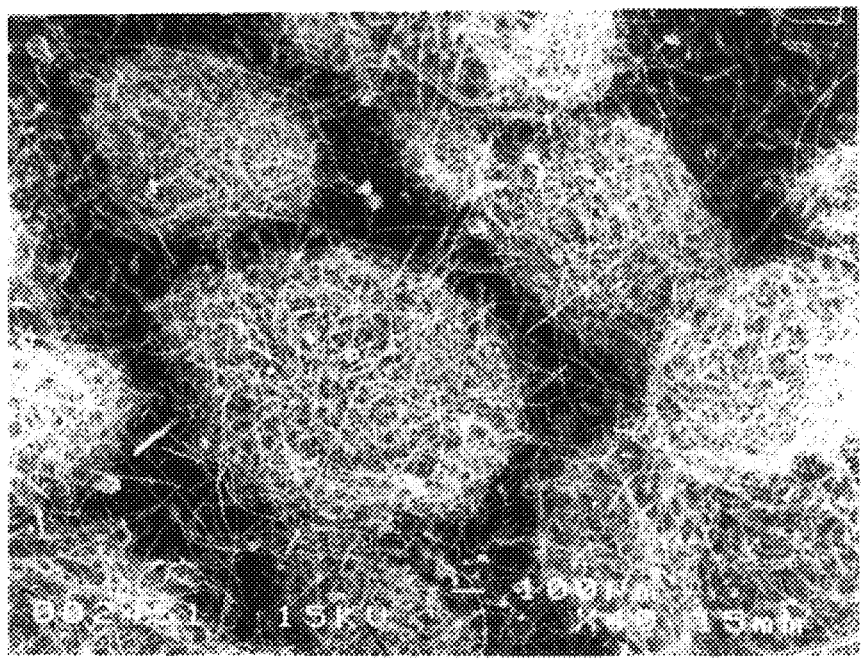
FIG. 1 is a scanning electron micrograph (40 magnifications) of particulate ceramic fiber agglomerates which can be used in the present invention.

The friction material according to the first embodiment of the present invention is produced by using particulate agglomerates of finely divided ceramic fibers as a part of a friction regulating material. The agglomerates are formed by gathering ceramic fibers having a fiber length of 5 to 700 μm and an average fiber length of 50 to 150 μm into particulates having an average particle size of 0.5 to 2 mm and a bulk density of 0.1 to 0.2 g/cm$^3$. The agglomerates preferably have a degree of tightness of not less than 40%.

The terminologies "bulk density" and "degree of tightness" as used herein mean values measured as follows.

Measurement of Bulk Density

A sample weighing 100 g is put in an upright metallic cylinder having an inner diameter of 150 mm, and a weight is placed on the sample to impose a load of 50 g per cm$^2$ of the opening of the cylinder. Five minutes later, the height of the sample is measured to obtain the volume V (cm$^3$).

Bulk density (g/cm$^3$)=100/V

Measurement of Degree of Tightness

In a 500 ml measuring cylinder are put 500 ml of water and 10 g of a sample, lightly stirred, and allowed to stand for 30 minutes, and the ceramic fiber sediment volume $V_1$ was measured. Separately, 10 g of the same sample is put in a 500 ml beaker, and 500 ml of water is added thereto, followed by stirring by means of a propeller stirrer at 700 rpm for 3 minutes. The whole amount of the ceramic fiber suspension is transferred to a 500 ml measuring cylinder and allowed to stand for 30 minutes. The ceramic fiber sediment volume $V_2$ is measured.

$$\text{Degree of Tightness (\%)}=[1-(V_2-V_1)/V_1]\times 100$$

Although the particulate agglomerates comprise finely divided ceramic fibers shorter than the particle diameter and no binding assistant such as a binder is used, the state of gathering of ceramic fibers is very stable. In particular, those having a degree of tightness of not less than 40% are hardly unbound into single fibers on usual handling or during use as a molding material. This seems to be because highly rigid ceramic fibers cross and support each other to form a stable three-dimensional network structure like a bird's net made of twigs (see FIG. 1).

The particulate ceramic fiber agglomerates can be prepared by means of a well-known stirring type granulator used for granulation of powder. That is, ceramic fibers finely divided to a fiber length of 5 to 700 μm and an average fiber length of 50 to 150 μm are stirred in a stirring type granulator. No binder is added.

Stock fiber compressed in a package usually forms irregular-sized lumps. On being stirred in a granulator, the lumps disintegrate and single fibers re-gather to form regular-sized fiber agglomerates. The rate of stirring influences the particle size of the fiber agglomerates. The gathering ceramic fibers are loosely entangled among themselves in the initial stage of stirring and, as they undergo a compressional stress of stirring, they gradually form agglomerates having a high packing density. On further continuing the stirring, while the packing density as measured in terms of bulk density is not so changed, the agglomerates become more stable to have the above-mentioned tightness probably because the fibers get into a stable state.

Particulate agglomerates having a degree of tightness of less than 40% easily disentangle, tending to fail to maintain the gathered state, when vigorously stirred with other raw materials in the course of production of a friction material. Therefore, in order to facilitate production of friction materials, it is preferable to continue stirring for a while after particulate agglomerates are seemingly completed so as to achieve a degree of tightness of 40% or more.

The ceramic fiber raw material is not particularly limited. Aluminosilicate fiber is the most preferred for its inexpensiveness, commercial availability, physical properties, and ease of granulation. Rock wool, alumina fiber and carbon fiber are also suitable as ceramic fiber. Generally available ceramic fibers, which have a fiber length of several millimeters or longer, can be finely divided to lengths suitable for the production of the above-mentioned particulate agglomerates by means of a dry process or wet process grinder.

The friction material according to the second embodiment of the present invention is produced by using molded porous particulates comprising finely divided ceramic fibers, a filler, and a binder.

The ceramic fiber raw material to be used here is the same as used in the first embodiment.

The filler which can be used in the present invention includes barium sulfate, wollastonite, calcium carbonate, cashew dust, and carbon powder. The kind and amount of the filler are appropriately selected to control frictional characteristics of the friction material.

Examples of suitable binders are sol binders, such as colloidal silica and colloidal alumina, ethyl silicate, and organic binders, such as phenol resin, polyvinyl alcohol and carboxymethyl cellulose (CMC). These binders may be used either individually or as a combination of two or more thereof.

Where a phenol resin is used as a binder for production of the friction regulating material according to the present invention, the resulting particulates are improved in the degree of tightness and the bulk density thereof is increased while they are cured on drying, and exhibit an effect of decreasing the scatter of fibers, i.e., dust generation which is caused by impact during the production of the friction material.

The filler is preferably used in an amount of 1 to 300 parts by weight, still preferably 50 to 200 parts by weight per 100 parts by weight of the ceramic fiber.

The inorganic binder is preferably used in an amount of 1 to 40 parts by weight (on a solid basis), and the organic binder is preferably used in an amount of not more than 25 parts by weight, each per 100 parts by weight of the ceramic fiber. Also in the case where a mixture of the inorganic binder and organic binder is used as a binder, it is preferred that the amount of the inorganic binder and the amount of the organic binder fall within the above ranges, respectively.

The above-described ingredients are stirred in a well-known stirring type granulator used for granulation of powder.

Stock fiber compressed in a package usually forms irregular-sized lumps. On being stirred in a granulator, the lumps disintegrate and single fibers re-gather to form regular-sized fiber agglomerates with the filler adhering onto the surface of the fibers with the aid of the binder. The gathering ceramic fibers are loosely entangled among themselves in the initial stage of stirring and, as they undergo a compressional stress of stirring, the packing density gradually increases. On further continuing the stirring, while the packing density as measured in terms of bulk density is not so changed, the state of fiber gathering becomes more stable. At this point, granulation by stirring is stopped, and the resulting particulates are dried by heating to set the binder. With properly selected formulation of raw materials and under properly selected stirring conditions, molded porous particulates having an average particle size of 0.1 to 5 mm and a bulk density of 0.2 to 2.0 g/cm$^3$ which are suitable as a friction regulating material can be obtained. Too dense particulates having a bulk density exceeding 2.0 g/cm³ fail to introduce sufficient pores into a friction material.

The molded porous particulates are very stable and are hardly unbound into single fibers on usual handling or during use as a molding material.

In the first and second embodiments of the present invention, the fibrous particulates are preferably used in an amount of 5 to 20% by weight based on the total molding material. If the proportion of the fibrous particulates is less than 5% by weight, there is a possibility that the effect produced is insufficient. If it exceeds 20% by weight, there is a possibility that reduction in strength of the resulting friction material becomes significant.

In the present invention, the fibrous particulates serve as a kind of a friction regulating material. It means that the fibrous particulates are used in appropriate combination with other raw materials generally employed in the production of friction materials. That is, one or more of fibrous base materials, such as asbestos, ceramic fibers, e.g., aluminosilicate fiber and alumina fiber, glass fiber, heat-resistant organic fibers, e.g., polyimide fiber and aromatic polyamide fiber, metallic fibers comprising copper, brass, steel, etc.; silica, graphite, molybdenum sulfide, silicon nitride, boron nitride, metallic powder, barium sulfate, wollastonite, cashew dust, and grinds of a thermosetting synthetic resin hardened product can be used in combination with the fibrous particulates of the present invention for the purpose of adjustment of friction characteristics and the like. For example, aramid fibers are preferably used in an amount of 5 to 10 parts by weight per 100 parts by weight of the fibrous particulates.

The thermosetting synthetic resin which can be used as a binder for preparing a friction material is not particularly limited and includes those commonly employed, such as novolak or resol phenolic resins and modified phenolic resins. For example, phenol resins are preferably used in an amount of 10 to 25 parts by weight per 100 parts by weight of the fibrous particulates.

All the raw materials are mixed as uniformly as possible. It is preferable to add the fibrous particulates after the other raw materials are uniformly mixed so that the porous particulate structure of the fibrous particulates may not be destroyed.

The resulting molding materials is hot-press molded into a prescribed shape in a usual manner to give a friction material of the present invention. While the mixture is hot-press molded under ordinary conditions, the fibrous particulates maintain their original shape without being flattened nor disintegrated into single fibers, and their porous structure is not destroyed due to, for example, penetration of the binder into the pores. Therefore, the fibrous particulates are uniformly dispersed in the final product while maintaining the porosity.

The present invention will now be illustrated in greater detail with reference to Examples, but it should be understood that the present invention is not deemed to be limited thereto.

EXAMPLE 1

Commercially available aluminosilicate fiber ($Al_2O_3$ 50% by weight; $SiO_2$: 50% by weight) was treated in a dry process grinder to obtain finely divided fibers having an average fiber length of 100 μm with not less than 95% by weight of which having a fiber length of 5 to 500 μm. The fine fibers were stirred in a stirring type granulator. The fibers initially had an irregular-sized lumpy form, but the lumps crumbled while single fibers gradually gathered into small particulates with stirring, and all the fibers turned to particulate agglomerates having a diameter of about 0.1 to 5 mm, mostly of 0.5 to 2 mm.

Six minutes' stirring gave particulate agglomerates having a bulk density of 0.147 g/cm³, a degree of tightness of 95%, and an average particle size of 1.2 mm. The scanning electron micrograph of the resulting fibrous particulates is shown in FIG. 1.

A molding material having the composition shown in Table 1 below (unit: part by weight) was hot-press molded to obtain a friction material (designated 1a to 5a).

TABLE 1

|  | 1a | 2a | 3a | 4a | 5a |
|---|---|---|---|---|---|
| Fibrous particulates | — | — | — | 5 | 10 |
| Non-granulated ceramic fiber* | — | 5 | 10 | — | — |
| Barium sulfate | 67 | 62 | 57 | 62 | 57 |
| Aramid fiber | 8 | 8 | 8 | 8 | 8 |
| Phenolic resin | 20 | 20 | 20 | 20 | 20 |
| Cashew dust | 5 | 5 | 5 | 5 | 5 |

Note:
*The finely divided fibers used in the preparation of the fibrous particulates.

The porosity and bending strength of each friction material were measured.

Porosity (%) was obtained according to the following equation.

Porosity (%)=(1−bulk density/apparent density)×100

Bending strength was measured according to JIS D 4311.

The results obtained are tabulated in Tables 2 and 3 below taking the ceramic fiber content as a parameter.

TABLE 2

Change in Porosity (%) with Ceramic Fiber Content

|  | Ceramic Fiber Content | | |
|---|---|---|---|
|  | 0% | 5% | 10% |
| Fibrous particulates-containing sample | 3.8 | 5.2 | 8.2 |
| Non-granulated fiber-containing sample | 3.8 | 4.2 | 6.3 |

TABLE 3

Change in Bending Strength (kgf/mm²) with Ceramic Fiber Content

|  | Ceramic Fiber Content | | |
|---|---|---|---|
|  | 0% | 5% | 10% |
| Fibrous particulates-containing sample | 6.4 | 6.3 | 5.6 |
| Non-granulated fiber-containing sample | 6.4 | 6.5 | 6.8 |

Figure 2:
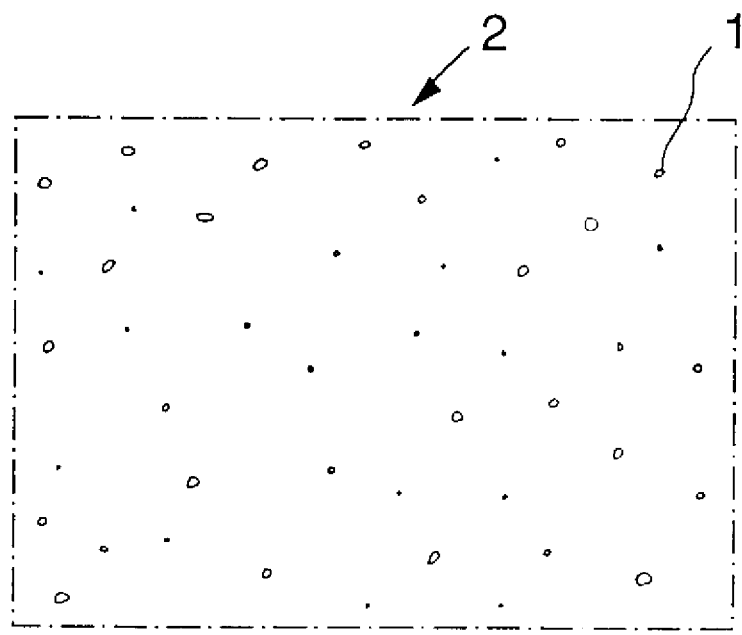
FIG. 2 is a surface view of the friction material of the present invention, showing the distribution of the particulate ceramic fiber agglomerates.
Figure 3:
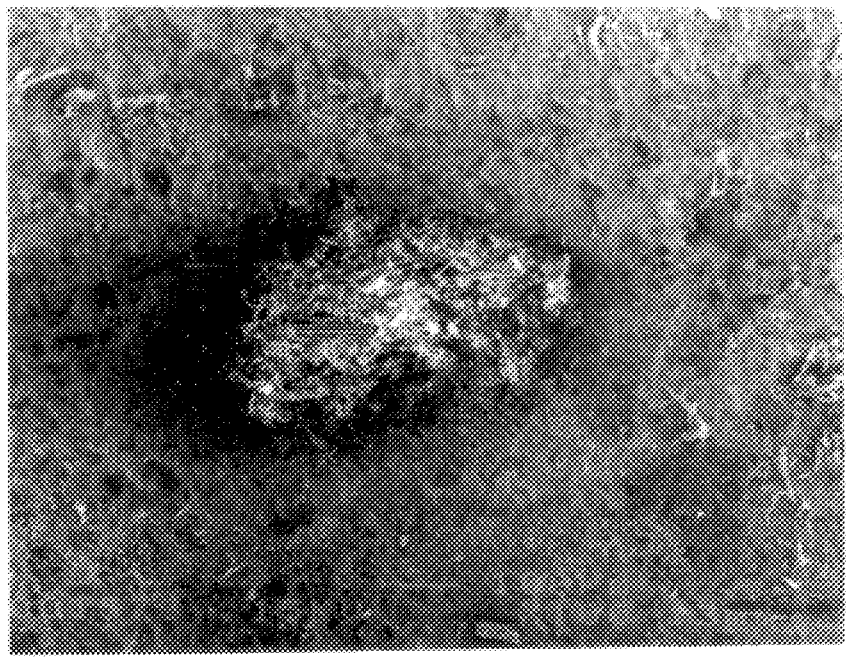
FIG. 3 is a scanning electron micrograph (100 magnifications) of the polished surface of the friction material of the present invention, showing the state of the particulate ceramic fiber agglomerate.
Figure 4:
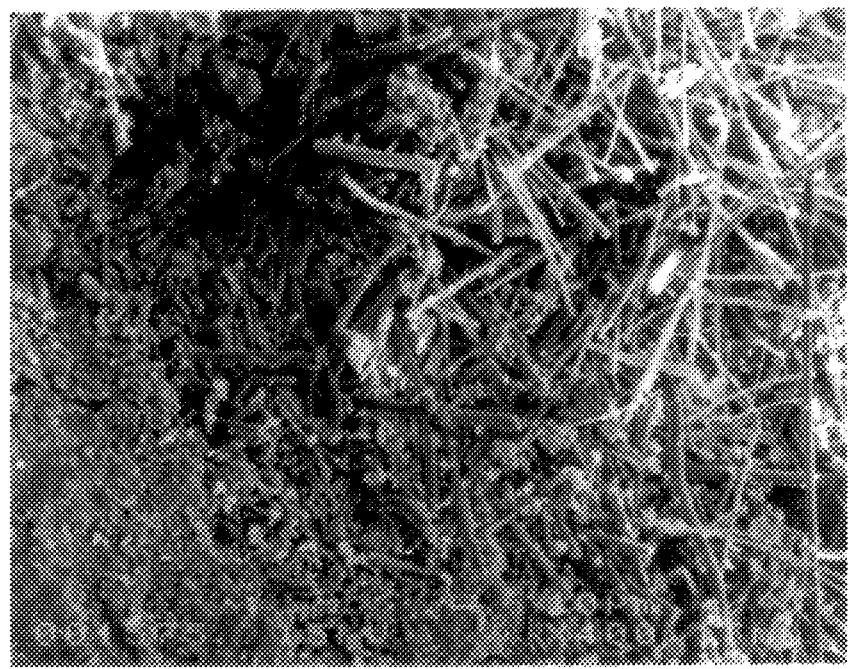
FIG. 4 is a scanning electron micrograph (400 magnifications) of the polished surface of the friction material of the present invention, showing the state of the particulate ceramic fiber agglomerate.

It is seen that friction materials 4a and 5a containing fibrous particulates (particulate ceramic fiber agglomerates) attain an increased porosity without suffering great reduction in bending strength. As is shown in FIG. 2, fibrous particulates 1 are uniformly distributed throughout friction material 2. Further, each fibrous particulate retained its porosity as is observed from the electron micrographs taken of the polished surface of the friction material (FIGS. 3 and 4).

Friction material 5a according to the present invention and comparative friction material 3a were subjected to an abrasion test using an abrasion tester in accordance with JIS D4411 "Automobile Brake Lining". Occurrence of squeaks was also examined. The results obtained are shown in Table 4 below.

TABLE 4

|  | No. 5a | No. 3a |
|---|---|---|
| Specific wear ($\times 10^{-7}$ cm$^3$/kg · m): | | |
| 100° C. | 1.6 | 1.5 |
| 150° C. | 1.1 | 1.0 |
| 200° C. | 1.3 | 1.2 |
| 250° C. | 1.5 | 1.5 |
| Squeak | not occurred | occurred |

EXAMPLE 2

Commercially available aluminosilicate fiber (Al$_2$O$_3$ 50% by weight; SiO$_2$: 50% by weight) was treated in a dry process grinder to obtain finely divided fibers having an average fiber length of 50 μm with not less than 95% by weight of which having a fiber length of 5 to 500 μm. The fine fibers and an equivalent amount of barium sulfate were stirred in a stirring type granulator for 1 minute. Colloidal silica and polyvinyl alcohol were added thereto in an amount of 30% by weight (on a solid basis) and 2% by weight, respectively, based on the aluminosilicate fiber, and the stirring was continued for an additional period of 4 minutes. The fibers initially had a lumpy form of irregular size, but the lumps crumbled while single fibers and barium sulfate are gradually formed into small particulates with stirring, and all the fibers turned to particulates having a diameter of about 0.1 to 5 mm.

Figure 5:
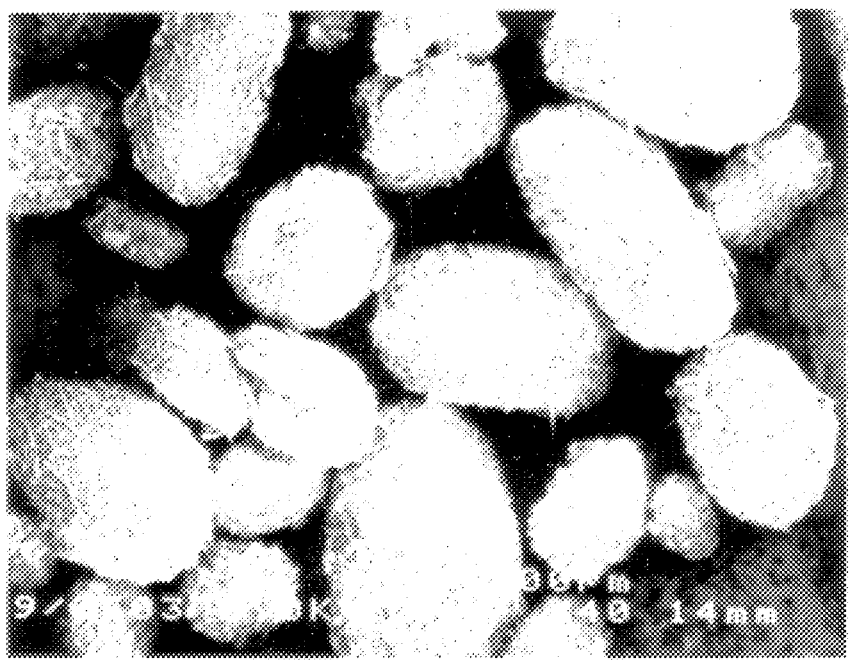
FIG. 5 is a scanning electron micrograph (40 magnifications) of the molded porous particulates which can be used in the present invention.

The resulting fibrous particulates had a bulk density of 0.80 g/cm$^3$, a porosity of 75.0%, and an average particle size of 0.4 mm, with not less than 95% by weight thereof having a particle size of 1 mm or less. The scanning electron micrograph of the resulting fibrous particulates is shown in FIG. 5.

A molding material having the composition shown in Table 5 (unit: part by weight) was hot-press molded to obtain a friction material (designated 1b to 7b).

TABLE 5

| | Friction material No. | | | | | | |
|---|---|---|---|---|---|---|---|
| | 1b | 2b | 3b | 4b | 5b | 6b | 7b |
| Fibrous particulates | — | — | — | — | 5 | 10 | 20 |
| Non-granulated ceramic fiber* | — | 5 | 10 | 20 | — | — | — |
| Barium sulfate | 67 | 62 | 57 | 47 | 62 | 57 | 47 |
| Aramid fiber | 8 | 8 | 8 | 8 | 8 | 8 | 8 |
| Phenolic resin | 20 | 20 | 20 | 20 | 20 | 20 | 20 |
| Cashew dust | 5 | 5 | 5 | 5 | 5 | 5 | 5 |

Note:
*The finely divided fibers used in the preparation of the fibrous particulates.

The porosity and bending strength of each friction material were measured. The results obtained are tabulated in Tables 6 and 7 below taking the ceramic fiber content as a parameter.

TABLE 6

Change in Porosity (%) with Ceramic Fiber Content

| | Ceramic Fiber Content | | | |
|---|---|---|---|---|
| | 0% | 5% | 10% | 20% |
| Fibrous particulates-containing sample | 3.8 | 4.4 | 4.5 | 5.1 |
| Non-granulated fiber-containing sample | 3.8 | 2.7 | 2.7 | 3.9 |

TABLE 7

Change in Bending Strength (kgf/cm$^2$) with Ceramic Fiber Content

| | Ceramic Fiber Content | | | |
|---|---|---|---|---|
| | 0% | 5% | 10% | 20% |
| Fibrous particulates-containing sample | 6.4 | 6.3 | 6.2 | 5.7 |
| Non-granulated fiber-containing sample | 6.4 | 7.2 | 6.9 | 6.9 |

Figure 6:
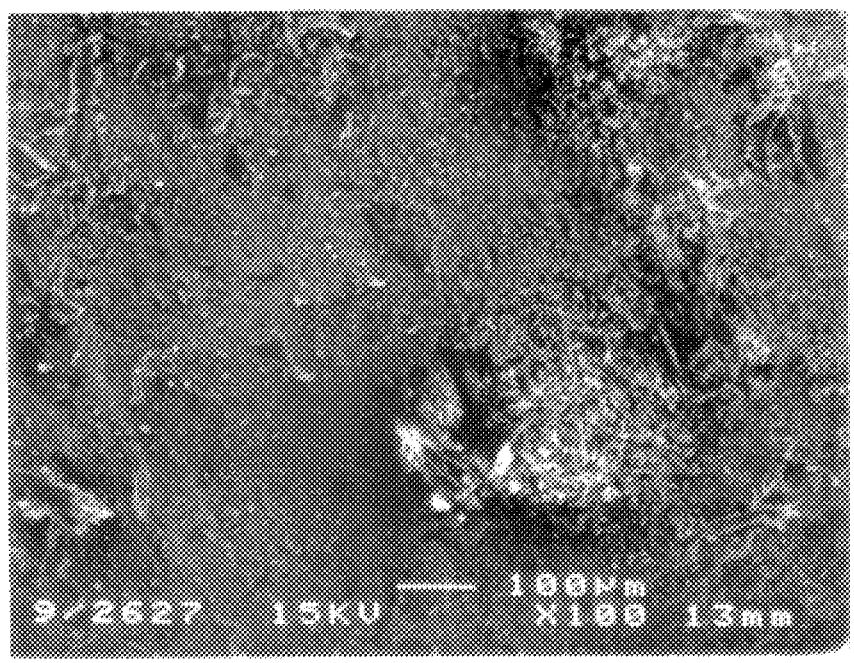
FIG. 6 is a scanning electron micrograph (100 magnifications) of the polished surface of the friction material of the present invention, showing the state of the molded porous particulates.
Figure 7:
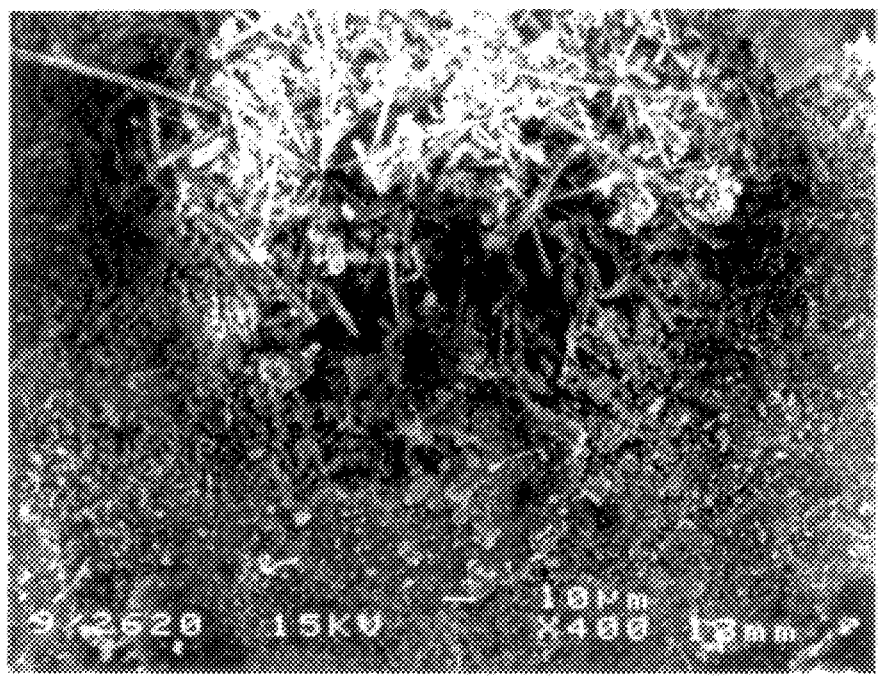
FIG. 7 is a scanning electron micrograph (400 magnifications) of the polished surface of the friction material of the present invention, showing the state of the porous molded particulate.

It is seen that friction materials 5b to 7b containing fibrous particulates (molded porous particulates) attain an increased porosity without suffering great reduction in bending strength. The fibrous particulates were uniformly distributed throughout friction material in the same manner as the fibrous particulates according to the first embodiment as shown in FIG. 2. As is observed from the electron micrographs taken of the polished surface of the friction material (FIGS. 6 and 7), each fibrous particulate retained its porosity.

Friction material 6b according to the present invention and comparative friction material 3b were subjected to an abrasion test with an abrasion tester in accordance with JIS D4411 "Automobile Brake Lining". Occurrence of squeaks was also examined. The results obtained are shown in Table 8 below.

TABLE 8

|  | No. 6b | No. 3b |
|---|---|---|
| Specific wear ($\times 10^{-7}$ cm$^3$/kg · m): | | |
| 100° C. | 1.6 | 1.5 |
| 150° C. | 0.9 | 1.0 |
| 200° C. | 1.0 | 1.2 |
| 250° C. | 1.3 | 1.5 |
| Squeak | not occurred | occurred |

As has been fully described, the technique of the present invention characterized by incorporation of porous fibrous particulates of ceramic fiber makes it possible to introduce fine pores into a friction material without causing reductions in strength and wear resistance thereby preventing squeaks during damping.

EXAMPLE 3

Preparation of Molded Particulates

To 100 parts of aluminosilicate fiber prepared in the same manner as in Example 2, 130 parts by weight of barium sulfate and 20 parts by weight of phenol resin powder were added, and the mixture was stirred for 4 minutes. After then, 9 parts by weight of colloidal silica (on a solid basis) and 3 parts by weight of polyvinyl alcohol (on a solid basis) were added thereto, and the mixture was stirred for 2 minutes and finally dried at 70° C. Thus, molded particulates having a bulk density of 0.71 g/cm³ and an average particle size of 0.3 mm were obtained.

Dusting Characteristics

The molded particulates were measured for dusting characteristics according to the following method.

Five grams of a sample (particulates) was dropped from a height of 1.2 m through a pipe having a diameter of 30 mm, and dust flying up by impact at dropping was counted for 1 minute with a digital dust meter P-5H2 (manufactured by Shibata Kagaku Kiki Kogyo Kabushiki Kaisha) at a height of 150 mm from the bottom.

The measurement of dusting characteristics proved that the molded particulates exhibited a value as extremely small as 206 CPM (count per minute), while the molded particulates of Example 2 exhibited 847 CPM.

Preparation of Friction Material

Next, a friction material was prepared in the same manner as Friction Material No. 7b of Example 2 except for using the above-prepared particulates in place of the fibrous particulates used in Example 2. The performance of the friction material is shown in Table 9 below.

TABLE 9

| | |
|---|---|
| Content of Particulates (% by weight) | 20 |
| Porosity (%) | 4.7 |
| Bending Strength (kgf/mm²) | 5.9 |
| Specific Wear (×10⁻⁷ cm³/kg · m) | |
| 100° C. | 1.6 |
| 150° C. | 1.1 |
| 200° C. | 1.2 |
| 250° C. | 1.4 |
| Squeak | not occurred |

While the invention has been described in detail and with reference to specific examples thereof, it will be apparent to one skilled in the art that various changes and modifications can be made therein without departing from the spirit and scope thereof.

What is claimed is:

1. A molded friction material for a damper comprising:

a fibrous base material, a friction regulating material, and a thermosetting synthetic resin binder, wherein the fibrous base material comprises particulate ceramic fiber agglomerates, which are composed of finely divided ceramic fibers having a fiber length of 5 to 700 μm and an average fiber length of 50 to 150 μm and have an average particle size of 0.5 to 2 mm and a bulk density of 0.1 to 0.2 g/cm³, and are dispersed in the friction regulating material.

2. A process for producing a friction material for a damper, which comprises:

hot-press molding a material containing particulate ceramic fiber agglomerates comprising finely divided ceramic fibers having a fiber length of 5 to 700 μm and an average fiber length of 50 to 150 μm and having an average particle size of 0.5 to 2 mm and a bulk density of 0.1 to 0.2 g/cm³ and a degree of tightness of not less than 40%.

3. A molded friction material for a damper comprising:

a fibrous base material, a friction regulating material, and a thermosetting synthetic resin binder, wherein molded porous particulates, comprising finely divided ceramic fibers having a fiber length of 5 to 700 μm and an average fiber length of 50 to 150 μm, a filler and a binder and having an average particle size of 0.1 to 5 mm and a bulk density of 0.2 to 2.0 g/cm³, are dispersed in the friction regulating material.

4. A material according to claim 3, wherein the binder is a phenol resin.

5. A process for producing a friction material for a damper, which comprises:

hot-press molding a material containing molded porous particulates comprising finely divided ceramic fibers having a fiber length of 5 to 700 μm and an average fiber length of 50 to 150 μm, a filler and a binder, and having an average particle size of 0.1 to 5 mm and a bulk density of 0.2 to 2.0 g/cm³.

6. The process of claim 5, wherein the filler is selected from the group consisting of barium sulfate, wollastonite, calcium carbonate, cashew dust, and carbon powder.

7. The process of claim 5, wherein the binder is a phenol resin.

* * * * *